Nov. 10, 1931.  W. R. MAGEE  1,831,311
GAUGE FOR SHEET METAL EDGE BENDING MACHINES
Filed July 15, 1930
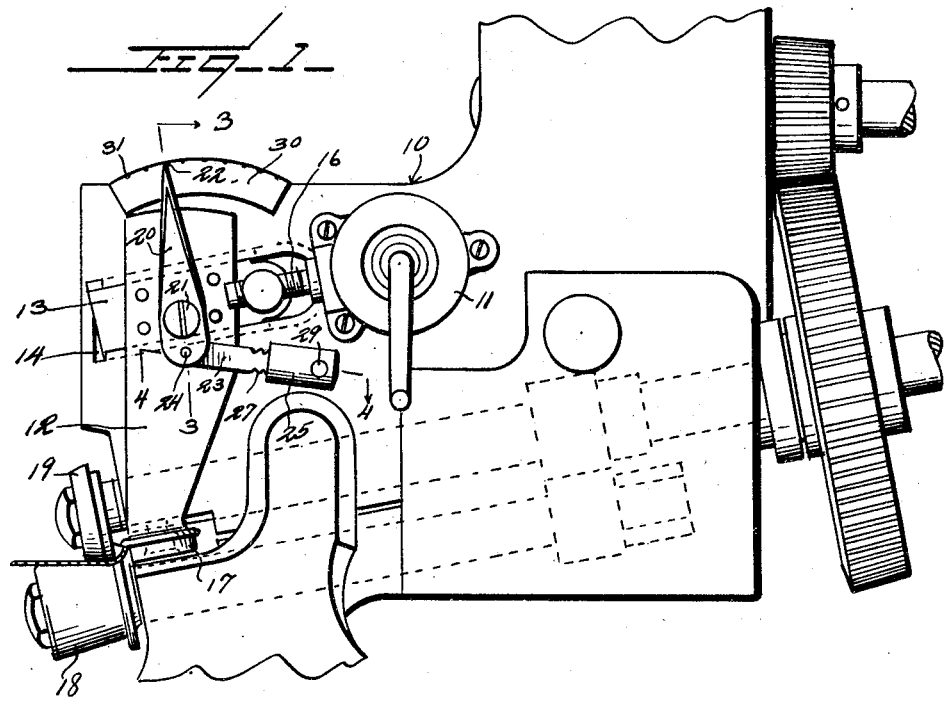
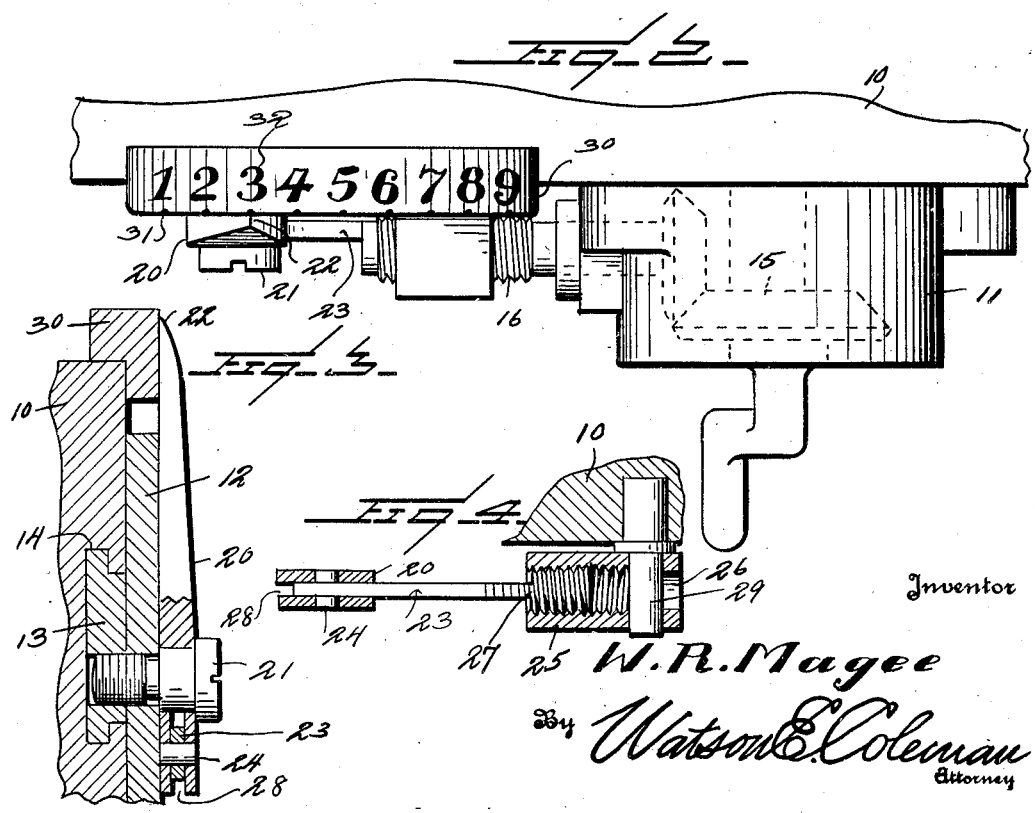
Inventor
W. R. Magee
By Watson E. Coleman
Attorney Patented Nov. 10, 1931

1,831,311

UNITED STATES PATENT OFFICE

WILBER R. MAGEE, OF ANN ARBOR, MICHIGAN

GAUGE FOR SHEET METAL EDGE BENDING MACHINES

Application filed July 15, 1930. Serial No. 468,164.

The present invention relates to gauges for sheet metal edge bending machines and is an improvement over the invention in my prior application Ser. No. 444,530 filed April 15, 1930 for gauges for sheet edge bending machines, Patent No. 1,763,797 granted June 17, 1930.

An object of this invention is to provide in a gauge of this character means by which the position of the gauge roller may be readily and quickly determined.

Another object of this invention is to provide a swingable indicator which is so mounted on the device as to swing over a graduated scale so that the relative position of the gauge may be determined at a glance and through the use of which it is possible for an operator of the bending machine to shift from one machine to another and by means of which it is possible for the operator of one machine to determine at a glance the position of the gauge mechanism of another machine.

The above and various other objects and advantages of this invention will in part be described in and in part be understood from the following detailed description of the present preferred embodiment, the same being illustrated in the accompanying drawings wherein:

Figure 1 is a detail side elevation of a sheet metal edge bending machine having a device constructed according to the preferred embodiment of this invention mounted thereon;

Figure 2 is a detail top plan view of the device;

Figure 3 is a sectional view taken on the line 3—3 of Figure 1; and

Figure 4 is a sectional view taken on the line 4—4 of Figure 1.

Referring to the drawings wherein like numerals of reference designate corresponding parts throughout the several views, the numeral 10 designates generally a section or frame of a sheet metal edge bending machine on which the gauge generally designated as 11 and more completely disclosed and described in my prior patent is mounted. The gauge mechanism 11 comprises a bracket 12 which is secured to a slide 13, the slide 13 being slidable in a track-way 14 and an operating mechanism 15 engages the slide 13 through the medium of a rotatable threaded shaft 16 so as to move the slide 13 and coactively move the bracket 12, the movement of the bracket 12 coactively moving the gauge roller 17 toward or away from the bending rolls 18 and 19.

In order to quickly and accurately determine the relative position of the gauge roller 17 with respect to the bending rolls 18 and 19, I have provided a swingable indicator or pointer 20 which is pivotally secured to the bracket 12 by means of a screw or bolt 21. The indicator 20 may be of any desired configuration and is provided at one end thereof with a relatively restricted point 22, the purpose for which will be hereinafter described.

A pitman generally designated as 23 is secured at one end to the indicator 20 as by a pivot 24 or the like and the opposite end of the pitman 23 is threadedly positioned in a rockable nut 25, the rockable nut 25 being provided with a longitudinally disposed threaded aperture 26 therethrough for receiving the threaded end 27 of the pitman 23.

The threaded end 27 of the pitman 23 is preferably round in cross section and the body of the pitman 23 is preferably flat and extends into a slot 28 in one end of the indicator 20 so that the indicator 20 may have rocking or swinging movement with respect to the pitman 23. The nut 25 is pivotally mounted on a pintle 29 which is carried by the frame structure 10, and the nut 25 is rockably positioned on the pintle 29 so that the pitman or link 23 may have relatively free rocking movement coactively with the swinging movement of the pointer or indicator 20.

A segmental plate 30 is mounted on the frame 10 in a position where the restricted end 22 of the indicator will swing directly in front thereof and the segmental plate 30 is provided with suitable graduations 31, the graduations 31 indicating the relative position of the gauge roller 17 with respect to the bending rolls 18 and 19.

Suitable indicia in the form of numbers 32 may be stamped or mounted on the scale plate 30 on either the vertical face or the peripheral face thereof so that graduations 31 may be properly identified. The scale plate 30 is of a suitable size so as to cover the complete movement of the pointer 20 as it swings on the pivot 21 by the movement of the bracket 22 toward or away from the bending rolls.

In the operation of this device, when the threaded shaft 16 is rotated by the operating mechanism 15, the slide 13 is moved longitudinally in the track-way 14 and coactive with the movement of the slide 13, the bracket 12 carrying the gauge roller 17 is moved so as to carry the gauge roller 17 toward or away from the bending rolls 18 and 19.

The movement of the bracket 12 will move the indicator 20 and inasmuch as one end of the indicator 20 is held against longitudinal movement with the bracket 12 by means of the pitman 23, the opposite end of the indicator will swing on an arc, this arc being described by the segmental graduated plate 30. Inasmuch as the plate 30 is constructed so as to cover the complete movement of the indicator 20, it will be obvious that the exact position of the gauge roller 17 may be readily and quickly determined.

Where a number of bending machines are used in what is termed "a battery of machines" it is possible to shift one operator from one machine to another machine without stopping the movement of the machine and the operator of one machine can tell at a glance the exact relation of the gauge roller 17 with respect to the bending rolls 18 and 19. It is also possible through the medium of the device herein disclosed to set each machine in exactly the same manner thereby permitting the duplication of an operation without the necessity of any experimental operations on the part of the operator.

It is, of course, understood that various changes and modifications may be made in the details of construction and design of the above specifically described embodiment of this invention without departing from the spirit thereof, such changes and modifications being restricted only by the scope of the following claims:

What is claimed is:—

1. In combination with a sheet metal edge bending machine, a gauge roller, movable supporting means for said gauge roller, an indicating member rockably mounted on said supporting means and adapted for movement therewith, means secured at one end to the bending machine and at the opposite end engaging said indicating member whereby to hold one end of said member against movement and coactively swing the opposite end on an arc, and a graduated segment positioned on the bending machine in close proximity to the indicating member whereby to determine the relative position of the gauge roller with respect to the bending rolls of the bending machine.

2. An indicating device of the character described comprising a fixed support, a movable member mounted on said support, a rockable indicator pivotally mounted on said movable member, a pitman secured at one end to said fixed member and at the opposite end to one end of said indicator whereby to rock the other end of said indicator upon movement of said movable member and means rockably mounted on said fixed member and engaging said pitman whereby to longitudinally adjust said pitman.

3. The combination with a sheet metal edge bending machine gauge having a gauge roller and a bracket for said roller, of a rockable gauge indicator, means for rockably mounting said indicator on said bracket whereby to permit movement of said indicator coactively with the movement of said bracket and gauge roller toward or away from the bending rolls of the bending machine, means for holding one end of said indicator against movement whereby to rock the opposite end of said indicator, and a graduated plate mounted on the bending machine and positioned in close proximity to said indicator.

In testimony whereof I hereunto affix my signature.

WILBER R. MAGEE.